(12) United States Patent
Martínez Galindo et al.

(10) Patent No.: US 12,530,388 B2
(45) Date of Patent: Jan. 20, 2026

(54) AUTOMATED ENRICHMENT OF ENTITY DESCRIPTIONS IN UNSTRUCTURED TEXT

(71) Applicant: INTERNATIONAL BUSINESS MACHINES CORPORATION, Armonk, NY (US)

(72) Inventors: Marcos Martínez Galindo, Dublin (IE); Leopold Fuchs, Stuttgart (DE); Gabriele Picco, Dublin (IE); Thanh Lam Hoang, Maynooth (IE); Vanessa Lopez Garcia, Dublin (IE); Marco Luca Sbodio, Castaheany (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/175,525

(22) Filed: Feb. 27, 2023

(65) Prior Publication Data

US 2024/0289371 A1 Aug. 29, 2024

(51) Int. Cl.
*G06F 16/35* (2025.01)
*G06F 16/31* (2019.01)
*G06F 40/30* (2020.01)

(52) U.S. Cl.
CPC ............ *G06F 16/35* (2019.01); *G06F 16/313* (2019.01); *G06F 40/30* (2020.01)

(58) Field of Classification Search
CPC ......... G06F 16/35; G06F 16/313; G06F 40/30
See application file for complete search history.

(56) References Cited

U.S. PATENT DOCUMENTS

| | | | |
|---|---|---|---|
| 11,043,214 B1* | 6/2021 | Hedayatnia | G10L 15/22 |
| 11,516,158 B1* | 11/2022 | Luzhnica | G06F 40/35 |
| 11,829,474 B1* | 11/2023 | Lu | G06F 18/2415 |
| 2002/0042793 A1* | 4/2002 | Choi | G06F 16/353 |
| 2010/0257193 A1 | 10/2010 | Krupka et al. | |
| 2018/0176661 A1* | 6/2018 | Varndell | H04N 21/2187 |
| 2019/0122111 A1 | 4/2019 | Min et al. | |
| 2021/0157990 A1* | 5/2021 | Lima | H04L 51/02 |
| 2021/0174003 A1* | 6/2021 | Meng | G06F 40/284 |

(Continued)

FOREIGN PATENT DOCUMENTS

| | | |
|---|---|---|
| CN | 110555083 B | 6/2021 |
| CN | 114298042 A | 4/2022 |

OTHER PUBLICATIONS

"IBM Deep Search," [online] Copyright © 2022 IBM, Jan. 31, 2023, retrieved from the Internet: < https://ds4sd.github.io/>, 6 pg.

(Continued)

*Primary Examiner* — Angelica Ruiz
(74) *Attorney, Agent, or Firm* — Harrity & Harrity, LLP

(57) ABSTRACT

Automatically enriching the descriptions of an entity mentioned in a sentence corpus includes generating multiple enriched descriptions corresponding to a label of the entity. Each of the multiple enriched descriptions is ranked. The ranking is generated by a machine learning model that is configured to determine a likelihood that an enriched description correctly describes the entity. The sentence corpus are annotated by coupling each mention of the entity with one or more of the enriched descriptions. The one or more enriched descriptions are selected based on the ranking. As annotated, the sentence corpus can be output.

20 Claims, 4 Drawing Sheets

(56) References Cited

U.S. PATENT DOCUMENTS

| | | | | |
|---|---|---|---|---|
| 2021/0365502 | A1* | 11/2021 | Hutchins | G06F 16/93 |
| 2022/0129629 | A1* | 4/2022 | Niu | G06F 40/242 |
| 2022/0198254 | A1* | 6/2022 | Dalli | G06N 3/084 |
| 2022/0253871 | A1* | 8/2022 | Miller | G06F 16/36 |
| 2022/0270721 | A1* | 8/2022 | Schrempf | G16H 30/20 |
| 2023/0022845 | A1* | 1/2023 | Meng | G06N 3/0464 |
| 2023/0080674 | A1* | 3/2023 | Attali | G06F 40/56 |
| 2023/0089285 | A1* | 3/2023 | Fan | G10L 15/22 |
| 2023/0298692 | A1* | 9/2023 | Fant | G16B 20/30 |
| | | | | 702/19 |

OTHER PUBLICATIONS

Aly, R. et al., "Leveraging Type Descriptions for Zero-shot Named Entity Recognition and Classification," Proceedings of the 59th Annual Meeting of the Association for Computational Linguistics and the 11th International Joint Conference on Natural Language Processing (vol. 1: Long Papers), Aug. 1-6, 2021, pp. 1516-1528.

Datta, S. et al., "A Relative Information Gain-based Query Performance Prediction Framework with Generated Query Variants," ACM Transactions on Information Systems, Dec. 21, 2022, vol. 41, No. 2, pp. 1-31.

Gadetsky, A. et al., "Conditional generators of words definitions," arXiv preprint arXiv:1806.10090, Jun. 26, 2018, 6 pg.

Noraset, T. et al., "Definition modeling: Learning to define word embeddings in natural language," InProceedings of the AAAI Conference on Artificial Intelligence, Feb. 12, 2017, vol. 31, No. 1, 8 pg.

Cheng, L. et al., Ent-desc: Entity description generation by exploring knowledge graph, arXiv preprint arXiv:2004.14813, Oct. 26, 2020, 11 pg.

"Zshot: Zero and Few shost named entitiy recognition plugin for Spacy," [online] © 2023 GitHub, Inc., GitHub.IBM.Com [retrieved Dec. 15, 2022], retrieved from the Internet: <https://github.ibm.com/Dublin-Research-Lab/zshot>, 5 pg.

Zhang, H. et al. "Improving Interpretability of Word Embeddings by Generating Definition and Usage," Expert Systems with Applications, Jul. 18, 2020, arXiv: 1912.05898v2, 12 pg.

Logeswaran, L. et al., "Zero-shot entity linking by reading entity descriptions," arXiv preprint arXiv:1906.07348, Jun. 18, 2019, 12 pg.

Hu, R.L. et al., "Zero-shot image classification guided by natural language descriptions of classes: A meta-learning approach," Advances in Neural Information Processing Systems vol. 268, 2018, 4 pg.

Yu, H. et al., "Zero-shot learning via simultaneous generating and learning," Advances in Neural Information Processing Systems, arXiv preprint, arXiv: 1910.09446v1, Oct. 21, 2019, 11 pg.

Mell, P. et al., The NIST Definition of Cloud Computing, National Institute of Standards and Technology, U.S. Dept. of Commerce, Special Publication 800-145, Sep. 2011, 7 pg.

Aly, R. et al., "Leveraging type descriptions for zero-shot named entity recognition and classification," In Proceedings of the 59th Annual Meeting of the Association for Computational Linguistics and the 11th International Joint Conference on Natural Language Processing, vol. 1, Long Papers, Aug. 2021, pp. 1516-1528.

Gao, T. et al., "FewRel 2.0: Towards more challenging few-shot relation classification," arXiv Preprint, arXiv:1910.07124, Oct. 16, 2019, 6 pg.

Han, X. et al., "Fewrel: A large-scale supervised few-shot relation classification dataset with state-of-the-art evaluation," arXiv Preprint, arXiv:1810.10147, Oct. 24, 2018, 7 pg.

* cited by examiner

AUTOMATED ENRICHMENT OF ENTITY DESCRIPTIONS IN UNSTRUCTURED TEXT

BACKGROUND

This disclosure relates to knowledge extraction from unstructured text, and, more particularly, to the automated generation of descriptions of entities used to train a machine learning model to identify and classify mentions of the entities in unstructured text.

Named entity recognition and classification (NERC) is an important data preprocessing task in many knowledge extraction applications. NERC relates to identifying entities in unstructured text and classifying the entities into predefined classes or categories. The classes include names, organizations, medical codes, time expressions, monetary values, and various other categories or classes. Machine learning models can perform NERC by learning to detect tokens that make up an entity—that is, a labeled unit of information (data) having a corresponding description—and its type wherever mentioned within the unstructured text. Labeled data needed for training such machine learning models can be difficult to obtain, however. To address the problem, some state-of-the-art approaches combine NERC with zero-shot or few-shot learning.

Zero-shot learning is a type of machine learning that can transfer information observed in training data to a previously unseen target. For example, although a zero-shot learner may not have been explicitly trained with an entity labeled cat, the learner nonetheless may have seen text descriptions describing a cat as an object having pointy ears and long whiskers. By transferring the information, the zero-shot learner can predict that a text description of an object having pointy ears and long whiskers is indeed a cat. Few-shot learning similarly generates predications, albeit based on a small number of training samples describing a given entity. Like zero-shot machine learning, few-shot machine learning can be integrated into NERC models.

SUMMARY

In one or more embodiments, a method includes generating multiple enriched descriptions corresponding to an entity mentioned in a sentence corpus input into a computer. The method includes ranking each of the enriched descriptions, the ranking of an enriched description corresponding to a likelihood that a machine learning classifier correctly classifies the entity mentioned in the sentence corpus using information from the enriched description. The method includes selecting a subset of the enriched descriptions based on the ranking and outputting the subset of enriched descriptions selected, the subset of enriched descriptions selected being usable to train the machine learning classifier.

In one aspect, the likelihood is determined based on an information entropy associated with each of the enriched descriptions.

In another aspect, the likelihood is based on a semantic similarity of encodings within an embedding space of each of the enriched descriptions and the entity.

In another aspect, the machine learning model implements an autoencoder that encodes each enriched description and each mention of the entity in an embedding space. The likelihood corresponds to the semantic similarity of the encodings of the enriched descriptions and the entity.

In another aspect, the ranking is revised in response to user-provided feedback. The user-provided feedback can include a user-generated description and/or a re-ranking of the plurality of enriched descriptions.

In another aspect, generating enriched descriptions of the entity includes enriching one or more initial descriptions input to the computer by a user. Enriching one or more initial descriptions input by the user can include enhancing or extending an initial description using a language model that predicts a next word based on one or more previous words. Enriching one or more initial descriptions input by the user can include generating a new description using a language model that paraphrases an initial description. The language model can be trained as a sequence-to-sequence generator.

In another aspect, enriched descriptions of an entity can be automatically generated in response to an input of the entity by the user without at least one initial description. The enriched descriptions can be generated using a template and language model configured to output an enriched description based on the template. The language model can be configured to use sequence-to-sequence text generation conditioned on the entity label.

In one or more embodiments, a system includes one or more processors configured to initiate executable operations as described within this disclosure.

In one or more embodiments, a computer program product includes one or more computer-readable storage media and program instructions collectively stored on the one or more computer-readable storage media. The program instructions are executable by a processor to cause the processor to initiate operations as described within this disclosure.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
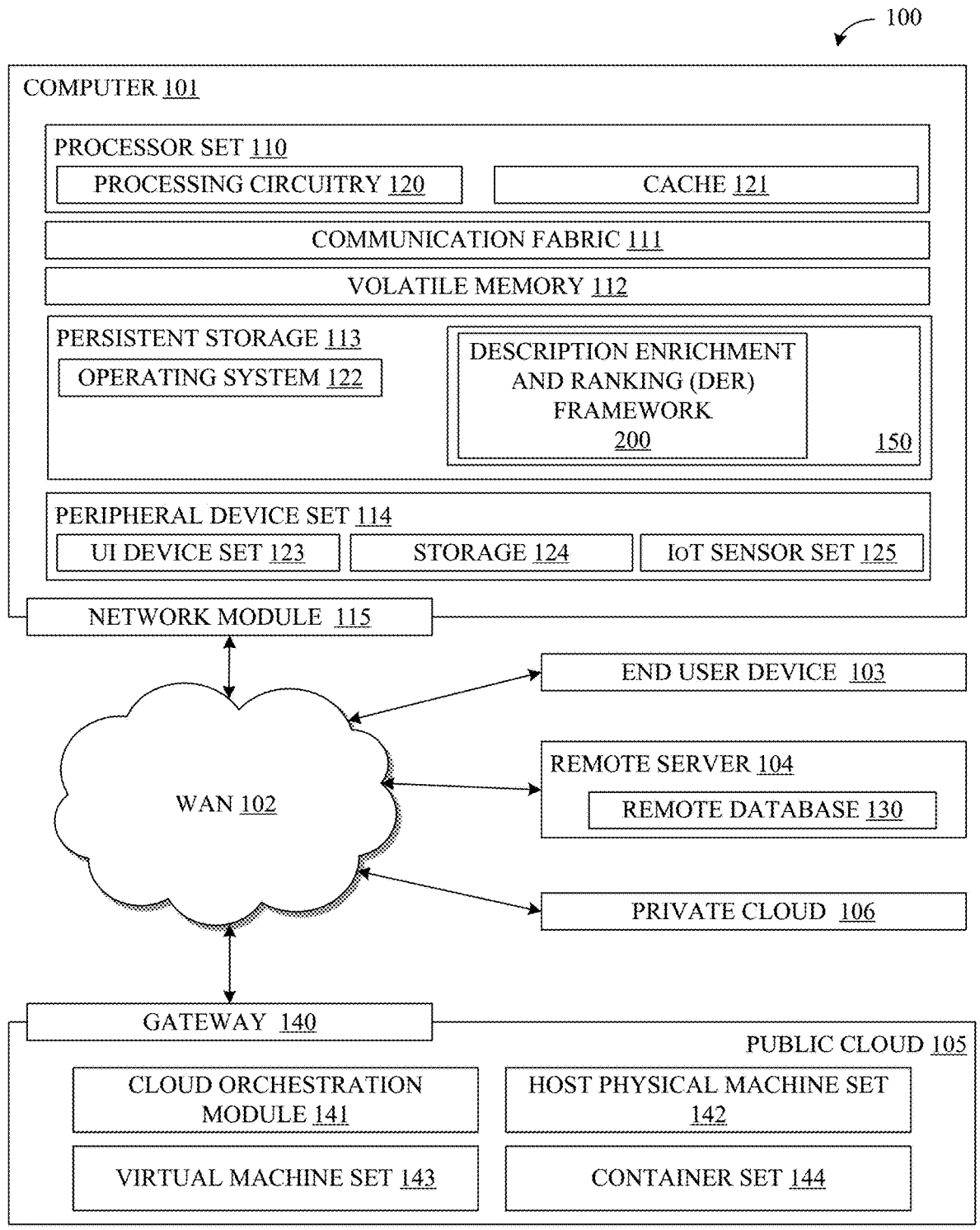
FIG. 1 illustrates an example of a computing environment that is capable of implementing an executable description enrichment and ranking (DER) framework.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to knowledge extraction from unstructured text, and, more particularly, to the automated generation of descriptions of entities used to train a machine learning model to identify and classify mentions of the entities in unstructured text. In accordance with the inventive arrangements described herein, methods, systems, and computer program products are provided that are capable of automatically generating and ranking enriched descriptions for training a machine learning model to identify and classify one or more specified entities. The enriched descriptions, automatically generated and ranked according to the inventive arrangements, enhance the predictive accuracy of the machine learning model (e.g., zero-shot model, few-shot model). Optionally, in certain embodiments, the inventive arrangements implement a feedback loop that enables a user to visualize (e.g., via a graphical user interface (GUI)) the rankings of enriched descriptions and to input feedback for fine-tuning the machine learning model.

A machine learning model such as the zero-shot NERC enables a user to annotate entity mentions in unstructured text by providing a relatively brief, initial text description of the entity (or entity classes) of interest. The zero-shot model automatically annotates the mentions and predicts, with a certain probability, whether the mentions belong to the given entity class of interest.

The enriched descriptions generated and selected based on their ranking in accordance with the inventive arrangements disclosed herein can be used for annotating entities mentioned in a sentence corpus. One aspect of the inventive arrangements is enhancing the capability and efficiency of the model in extracting domain-specific knowledge from scientific publications, research papers, medical records, patents, records of clinical trials, and various other unstructured text that provides domain-specific information.

One aspect of the inventive arrangements disclosed herein is ranking enriched descriptions of an entity based on model-determined entropy, semantic similarities, F1 scores, other probabilistic metrics, or combinations thereof. The rankings of the enriched descriptions correspond to the probabilistic metrics, which in turn indicate the likelihood that the machine learning model correctly classifies the corresponding entity.

In embodiments of the inventive arrangements that provide a feedback loop, the user input can include the user's re-ranking of the enriched descriptions, as well as user modification of an annotation automatically generated. The user modification and/or re-ranking can be fed to the machine learning model via the feedback loop. The feedback can refine or further improve the predictive accuracy of the machine learning model.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code in block 150 involved in performing the inventive methods, such as a description enrichment and ranking (DER) framework 200 implemented as executable program code or instructions. DER framework 200 is capable of automatically generating entity descriptions and ranking each to improve the predictive accuracy of a machine learning model. Optionally, DER framework 200 leverages suggested re-rankings and/or annotation modification provided a user via a feedback loop. Based on the input of one or more entities, each specified by an entity label, and optionally, textual description for one or more entities, DER framework 200 can output automatically generated and ranked enriched descriptions for each entity. DER framework 200 can generate one or more probabilistic metrics (e.g., entropy, semantic similarities, confidence scores) for ranking the enriched descriptions. The probabilistic metrics correspond to the predictive accuracy of a machine learning model in identifying and classifying mentions of the one or more entities, the mentions appearing in a corpus of sentences.

Computing environment 100 additionally includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and DER framework 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (e.g., a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
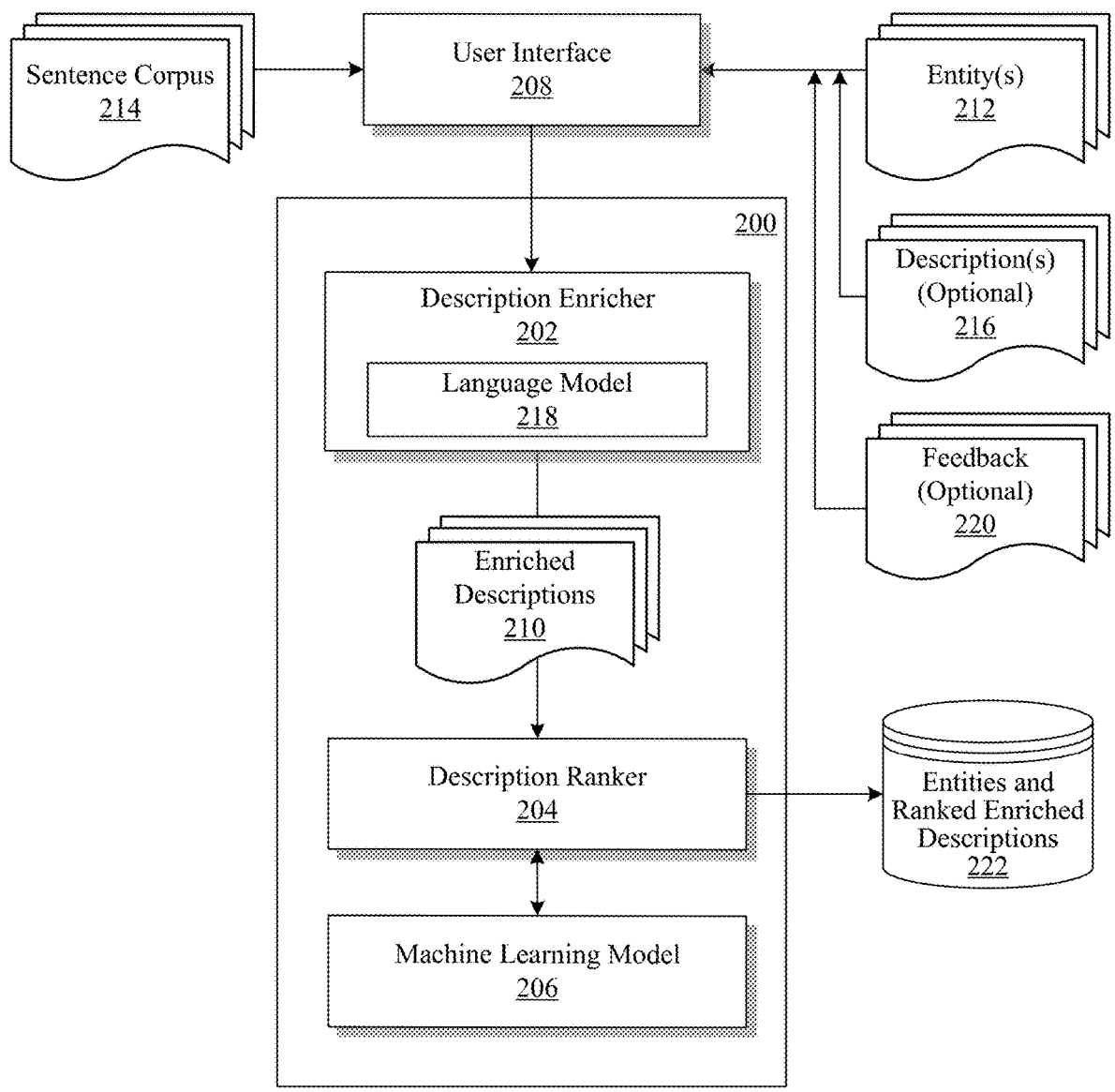
FIG. 2 illustrates an example architecture of the executable DER framework of FIG. 1.

FIG. 2 illustrates an example architecture for the executable DER framework 200 of FIG. 1. In the example of FIG. 2, DER framework 200 illustratively includes description enricher 202, description ranker 204, and machine learning model 206.

Operatively, description enricher 202 generates a set of N enriched descriptions D' of an entity E. D'=Enrichment(D), where D) is a description of entity E, the description supplied by a user or generated by a language model as described below. Given the N enriched descriptions D' and one or more sentences S input to DER framework 200, description ranker 204 ranks the enriched descriptions D', generating D"=Ranked(D', S), where D" is a set of ranked enriched descriptions of entity E mentioned in S. A ranking of an enriched description corresponds to a likelihood that machine learning model 206 (e.g., zero-shot model, few-shots model) correctly classifies the mentions of entity E in the one or more sentences S. As described in greater detail below, a ranking can be based on entropy. The entropy is determined by machine learning model 206, which labels each of the N enriched descriptions D'. The label of the i-th enriched description $D'_i$ can comprise a weighted score. The weighted score can correspond to the semantic similarity (e.g., Euclidean distance, Manhattan distance, cosine similarity) between the i-th enriched description $D'_i$ and the description D. In addition to entropy and/or semantic similarity, other metrics can be used to rank the descriptions. Description ranker 204 can sort enriched descriptions according to the rankings of each of the enriched descriptions as labeled. Sorting based on the labels arranges the labeled enriched descriptions D" such that ZS(D"$_{i-1}$, S)<ZS (D"$_i$, S)<ZS(D"$_{i+1}$, S), where ZS(D"$_i$, S): ∀i∈{1, . . . , N} comprises a set of labels with respect to the one or more sentences S In some embodiments, given the N enriched descriptions D' and labels ZS generated by machine learning model 206, the user can provide feedback to adjust or refine the rankings. Description ranker 204 re-ranks the enriched descriptions based on the user feedback. In certain embodiments, description ranker 204 sorts the re-ranked enriched descriptions based on an F1-score, which is computed based on the labelling of S using the i-th description D'$_i$: ∀i∈{1, . . . , N} and which yields ZS(D"$_{i-1}$, S)>ZS(D"$_i$, S)>ZS(D"$_{i+1}$, S). The F1-score measures the predictive accuracy of machine learning model 206 according to the harmonic mean of the model's precision and recall. In cases in which a labelled corpus C is available for input to DER framework 200 at the outset, description ranker 204 can sort the set of descriptions based on the F1-score rather than entropy. Whereas the corpus S comprises sentences that are to be annotated by DER framework 200, corpus C comprises sentences that are already annotated. Using corpus C, the predictive accuracy of machine learning model 206 can be measured by the F1-score or another supervised learning metric rather than an unsupervised learning metric such as entropy.

Figure 3:
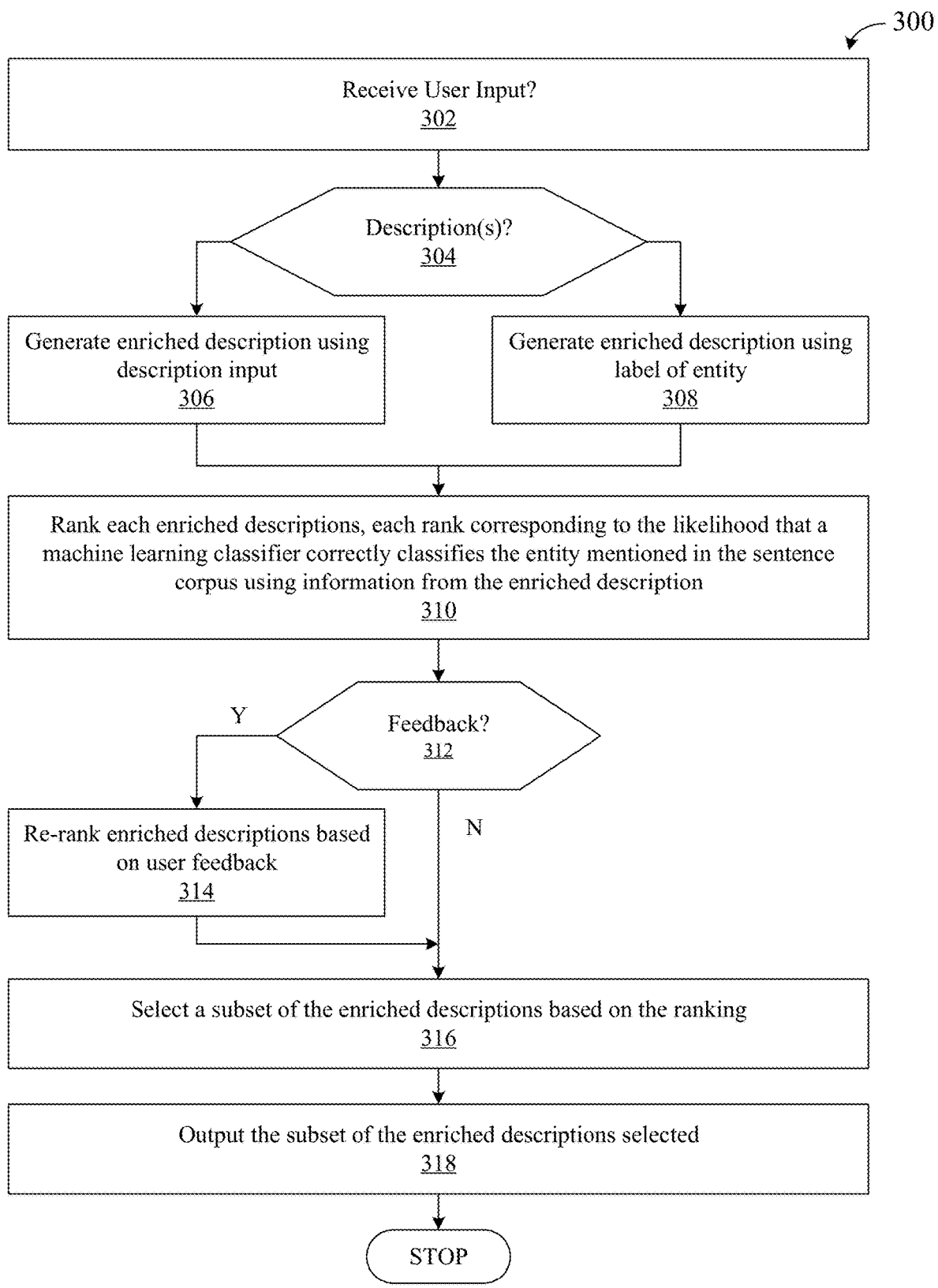
FIG. 3 illustrates an example method of operation of the DER framework of FIGS. 1 and 2.

FIG. 3 illustrates an example method 300 of operation of the DER framework 200 of FIGS. 1 and 2. Referring collectively to FIGS. 2 and 3 collectively, in block 302, a user inputs entity 212 and sentence corpus 214 via user interface 208. In block 304, DER framework 200 determines whether a description 216 for entity 212 is supplied by the user or is otherwise electronically stored and accessible by description enricher 202. If so, in block 306, description enricher 202 generates enriched descriptions 210 using description 216. Otherwise, in block 308, description enricher 216 generates enriched descriptions 210 from a description created with only a label supplied by the user and corresponding to entity 212.

In block 306, description enricher 202 generates enriched descriptions 210 from description 216 by enriching description 216 using language model 218. Language model 218 can be implemented as a machine learning model. In various embodiments, language model 218 is trained to generate enhanced text by predicting words $w_t$ (for enriching description 216) based on words $w_{t-k}, \ldots, w_{t-1}$ from description 216 and from already-generated generated words used in creating one or more other enriched descriptions or the one currently being constructed. Language model 218, in certain arrangements, predicts words $w_t$ using a predetermined conditional probability distribution Prob($w_t|w_{t-k}, \ldots, w_{t-1}$) conditioned on words $w_{t-k}, \ldots, w_{t-1}$. In certain embodiments, language model 218 paraphrases description 216 to generate an enriched description of entity 212. Language model 218 can be trained to generate enriched descriptions 210 using a sequence-to-sequence approach that predicts words of text conditioned on description 216.

Language model 218 in some embodiments is a pretrained language model that paraphrases description 216 in a manner that preserves the substance of information conveyed by description 216 while modifying the form in which the information is presented. The form of description 216 is modified by language model 218 in a manner that enables machine learning model 206 (e.g., zero-shot learning model) to more easily learn from the information conveyed in description 216. In paraphrasing description 216, language model 218 can generate a summary of information such that the resulting description contains the same information, but is compactly summarized. Language 218 can be trained as a sequence-to-sequence language processor for paraphrasing description 216. Models that implement sequence-to-sequence processing predict next words based on conditional probabilities (described above) derived from the original form of description 216. The result is a new description. Typical examples of sequenced-to-sequence processors are those based on the encoder-decoder architecture, where the encoder codifies an initial description (e.g., description 216), and the decoder uses this representation to generate a new description.

In block 308, if no description of entity 212 is provided, then language model 218 generates enriched descriptions 210 from a label assigned to entity 212. Using the label, language model 218 generates enriched descriptions 210 from scratch. Language model 218, in certain embodiments, generates enriched descriptions 210 based on the label using a template (e.g., "description of label:"). Language model 218 can be trained to generate enriched descriptions 210 based on a label of entity 212 using the sequence-to-sequence approach.

In block 310, decision ranker 206 ranks each of enriched descriptions 210 generated by description enricher 202. Each ranking of an enriched description corresponds to the likelihood that machine learning model 206 correctly classifies mentions of entity 212 in the sentences of sentence corpus 214 using information transferred to machine learning model 206 by the enriched description. In various embodiments, description ranker 204 can implement different models to generate specific metrics for ranking enriched descriptions 210 to indicate the strength of correspondence of each to the entity. The various metrics, in some embodiments, can be combined to determine the rankings. The rankings, in different embodiments, can be determined based on information entropy, semantic similarities, other probabilistic metric, or a combination thereof. The metric is a measure of uncertainty or confidence level of predictions (e.g., classifications) generated by machine learning model 206.

In certain embodiments, description ranker 204 determines rank by computing an entropy associated with enriched descriptions 200 and mentions of entity 200. The entropy of a random variable, generally, provides a measure of uncertainty over a probability distribution of the variable's different states (e.g., assignment to a category or class). Implementing a zero-shot machine learning classifier, description ranker 204 determines for each mention in sentence corpus 214 the probabilities that the mention belongs to one of a plurality of classes. Each class can represent a state that corresponds to one of enriched descriptions. The probabilities associated with each class (likelihood the mention belongs to the class) as determined by the zero-shot machine learning classifier, are used by description ranker 204 to determine the entropy. By selecting a subset (one or more) of enriched descriptions 200 that minimizes the entropy, description ranker 204 is able to select those enriched entities that more likely describe the entity accurately and completely.

In other embodiments, description ranker 204 can implement an encoder to encode the mentions of the entity in sentence corpus 214 and each of enriched descriptions 200 in an embedding space. Using a distance metric (e.g., Euclidean distance, Manhattan distance) or cosine similarity, description ranker 204 can determine semantic similarities between the entity and enriched descriptions based on their respective closeness within the embedding space. Description ranker 204 can rank the enriched descriptions 200 based on the individual semantic similarity of each with respect to the entity. In cases in which one or more original descriptions are input by the user, DER framework 200 uses the input in determining the information the user wishes to extract and automatically generates enriched descriptions 210 based on the input. Based on description ranker 204's determination of semantic similarities, DER framework 200 ensures that enriched descriptions 210 are optimally similar, or approximately so, to the one or more original descriptions input by the user. In other embodiments, other measures can be used by DER framework 200 to ensure that the enriched description 200 are optimally similar, or approximately so, to one or more original descriptions input by the user. For example, entropy, which is commensurate with a level of confidence in language model 218 predictions, can ensure that enriched descriptions 200 are ranked in accordance with the entropy associated with each description. Other ranking metrics also can be used by description ranker 204 in other embodiments.

In block 312, a user optionally can provide feedback 220 to DER framework 200 via user interface 208. In block 314, description ranker 204 can revise the earlier ranking of enriched descriptions 210 in response to user-provided feedback 220. User-provided feedback 220 can include a user-generated description that prompts a re-ranking of enriched descriptions 210, the re-ranking determined as described but incorporating the newly provided description. Alternatively, or additionally, user-provided feedback 220 can include user-specified rankings of some or all of enriched descriptions 210. Optionally, the user can visualize (e.g., via a GUI) the machine-generated ranking and select a specific one of enriched descriptions 210. The user also can correct one or more annotations of sentence corpus 214 generated using enriched descriptions 210. User corrections can be fed to the machine learning models 208 in a feedback loop to improve the rankings of the generated descriptions.

In block 316, based on the rankings a subset comprising one or more of enriched descriptions 210 is selected as an effective description of the entity. In certain embodiments, the top-k ranked enriched descriptions are selected. In other embodiments, only those enriched entities whose rank is greater than a predetermined threshold are selected. The ranking indicates a strength of association between the entity and enriched descriptions. The stronger the association, the greater the likelihood that an enriched description correctly and accurately corresponds to the entity.

The subset of enriched descriptions selected is output in block 318. The output optionally can be stored electronically in database 222. Machine learning model 206, as a zero-shot model, can learn using the subset of enriched descriptions selected. Zero-shot learning enables a model (e.g., deep learning network) already trained (e.g., using supervised learning) to learn without additional training data. In the present context, enriched descriptions selected based on their respective rankings and corresponding to one or more entities, enable machine learning model 206, as a zero-shot learner, to identify and extract the one or more entities from sentence corpus 214 based on inferences. Because the enriched descriptions selected are ones that individually reduce the entropy associated with machine learning model 206's classifying of entity 212 and/or have relatively higher confidence levels of the model's predictions, machine learning model 206 provides as an optimal, or near optimal, predictor.

Figure 4:
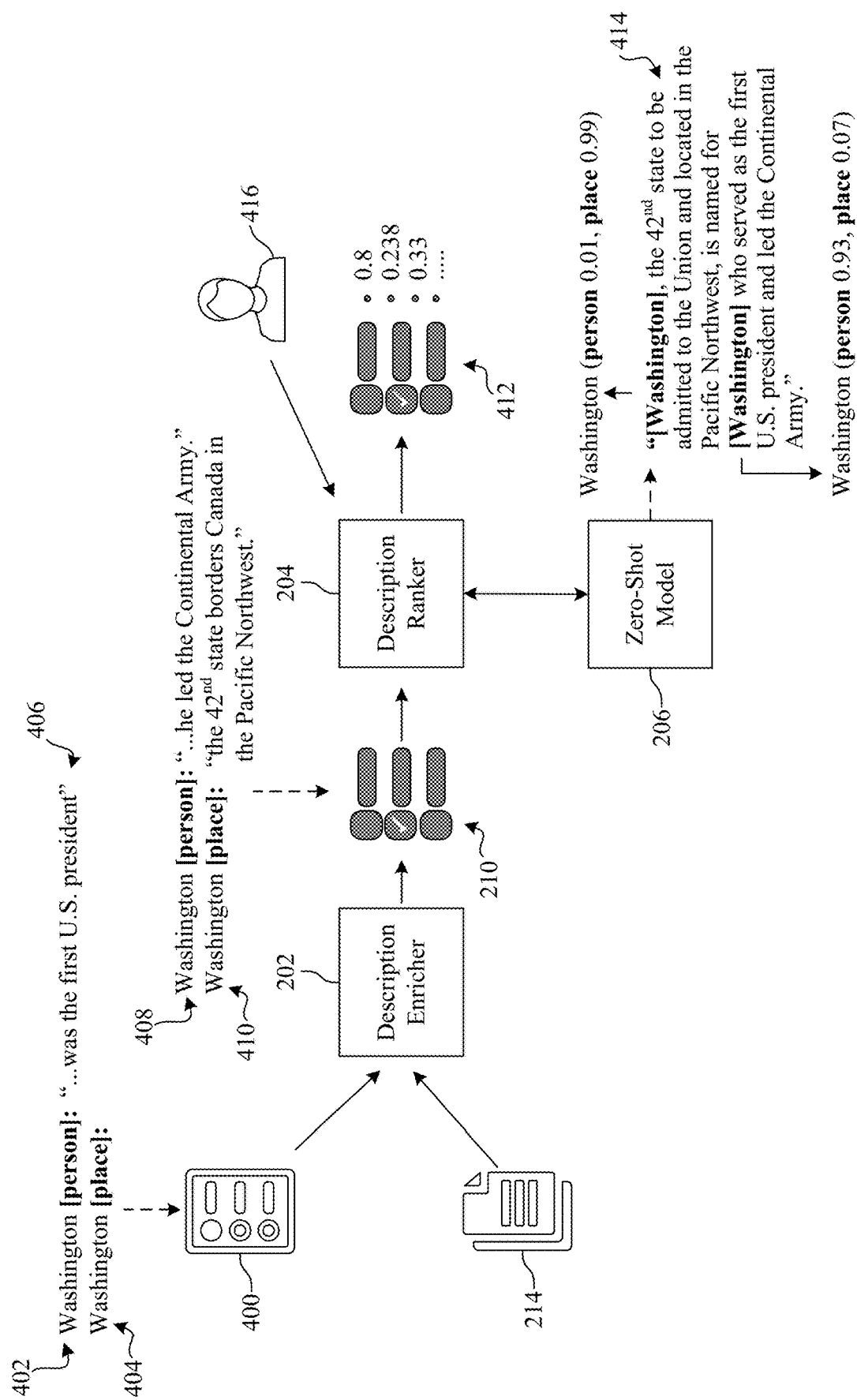
FIG. 4 illustrates certain operative aspects of the DER framework of FIGS. 1 and 2.

FIG. 4 illustrates certain operative aspects of DER framework 200. Machine learning model 206 in FIG. 4 is illustratively a zero-shot named entity recognition model. Implementing zero-shot entity recognition, machine learning model 206 learns to predict entity classes by leveraging textual descriptions input by users. Based on classification of entities with a certain probability (e.g., using multi-class classification), machine learning model 206 annotates mentions of entities in a text based on the descriptions. DER framework 200, implementing the processes described above, is capable of automatically generating enriched descriptions 210 to improve the accuracy of the model's predictions, while optionally also leveraging user input as part of a feedback loop.

Illustratively, in FIG. 4, input 400 includes multiple entities 402 and 404. Entity 402 is labeled "Washington [man]" having description 406 " . . . was the first U.S. president." Entity 404 is labeled "Washington [state]" and is input without any description. Description enricher 204 generates enriched descriptions 210. Enriched descriptions 210 illustratively include enriched description 408 " . . . he led the Continental Army," which is generated by description enricher 202 from the label of entity 402. Enriched descriptions 210 generated by description enricher 202 also include enriched description 410 "the 42nd state borders Canada in the Pacific Northwest." Description ranker 204, generates rankings 412, which ranks enriched descriptions 210. Optionally, ranking 412 is based in part on feedback of user 416. The feedback can re-rank enriched descriptions 210 and/or add, delete, or modify an enriched description. Machine learning model 206 is illustratively a zero-shot model that can determine rankings based on computing an entropy or semantic similarity.

Sentence 414 illustrates a sentence from sentence corpus 214 that is annotated by machine learning model 206 for determining the metrics (e.g., entropy, semantic similarity) corresponding to the likelihood that machine learning model 206 classifies the mentions of entities 402 and 404. The brackets in sentence 414 indicate mentions of entities that DER framework 200 classifies. Depending on the model (e.g., zero-shot learning model) used, the mentions can be automatically extracted by the model itself or, optionally, by a mentions extractor that extracts the mentions (indicated by brackets) for annotating. In FIG. 4, DER framework 200, using the processes already described, classifies each of the mentions. The first mention is classified as Washington the state according to the probabilities determined by DER framework 200, which assigns a 0.01 probability to the bracketed term being correctly classified for annotation as Washington the person and a 0.99 probability that the term is correctly classified for annotation as Washington the place. The second mention is classified as Washington the person based on DER framework 200's assigning a 0.93 probability to the bracketed term being correctly classified for annotation as the person and a 0.07 probability that the term is correctly classified for annotation as the place. Here, machine learning model 206 has not previously learned using data that includes either entity mentioned (Washington the person or the place) in sentence 414 but illustratively must annotate each mention with either an annotation corresponding to Washington the person or one corresponding to Washington the place. Based on enriched descriptions 210, which illustratively includes enriched descriptions 406, 408, and 410, machine learning model 206 determines respective probabilities of the correct annotation for each mention and annotates each based on the respective probabilities.

In other embodiments, machine learning model 206 is capable of annotating mentions of the entities without having previously been presented the entities during learning. Though not having seen the entities previously, machine learning model 206 is capable of annotating the mentions based only on the descriptions.

The terminology used herein is for the purpose of describing particular embodiments only and is not intended to be limiting. Notwithstanding, several definitions that apply throughout this document now will be presented.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" refers to a human being.

The terms "first," "second," etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   generating, by a processor of a computer, a plurality of enriched descriptions corresponding to an entity, wherein the entity is mentioned in a sentence corpus input to the computer;
   computing, by the processor, using a machine learning model, and based on determining a probability that each mention of the entity in the sentence corpus belongs to one of a plurality of classes, an entropy associated with the plurality of enriched descriptions,
      wherein the machine learning model is configured to learn without additional training data, and
      wherein the machine learning model identifies and extracts the entity from the sentence corpus based on inferences;
   ranking, by the processor, using a semantic similarity model, and based on computing the entropy using the machine learning model, each of the plurality of enriched descriptions, wherein a ranking of an enriched description, of the plurality of enriched descriptions, corresponds to likelihood that a machine learning classifier correctly classifies the entity mentioned in the sentence corpus using information from the enriched description;
   selecting, based on the ranking, a subset of the plurality of enriched descriptions that reduces the entropy; and
   outputting the subset of the plurality of enriched descriptions selected.

2. The method of claim 1,
   wherein the likelihood is determined based on a semantic similarity of embedding space encodings of each of the enriched descriptions and the entity.

3. The method of claim 1,
   wherein the method further comprises:
      revising the ranking in response to user-provided feedback, wherein the user-provided feedback includes at least one of a user-generated description or a re-ranking of the plurality of enriched descriptions.

4. The method of claim 1, wherein the generating includes enriching one or more initial descriptions input to the computer by a user.

5. The method of claim 4, wherein the enriching one or more initial descriptions includes extending an initial description using a language model that predicts a next word based on one or more previous words.

6. The method of claim 4, wherein the enriching one or more initial descriptions includes generating a new description using a language model that paraphrases an initial description, wherein language model is trained as a sequence-to-sequence generator.

7. The method of claim 1, wherein the generating includes automatically generating the enriched descriptions in response to an input of the entity without at least one initial description.

8. The method of claim 7, wherein the automatically generating is performed using a template and language model configured to generate an enriched description based on the template.

9. The method of claim 7, wherein the automatically generating is performed using a template and language model configured to use sequence-to-sequence text generation conditioned on an entity label.

10. A system, comprising:
one or more processors configured to initiate operations including:
generating a plurality of enriched descriptions corresponding to an entity mentioned in a sentence corpus input to a computer;
computing, using a zero-shot machine learning model, and based on determining a probability that each mention of the entity in the sentence corpus belongs to one of a plurality of classes, an entropy associated with the plurality of enriched descriptions;
ranking, using a semantic similarity model and based on computing the entropy using the zero-shot machine learning model, each of the plurality of enriched descriptions, wherein a ranking of an enriched description, of the plurality of enriched descriptions, corresponds to likelihood that a machine learning classifier correctly classifies the entity mentioned in the sentence corpus using information from the enriched description;
selecting, based on the ranking, a subset of the plurality of enriched descriptions that reduces the entropy; and
outputting the subset of the plurality of enriched descriptions selected.

11. The system of claim 10, wherein the likelihood is determined based on a semantic similarity of embedding space encodings of each of the enriched descriptions and the entity.

12. The system of claim 10, wherein the one or more processors are configured to initiate operations further including:
revising the ranking in response to user-provided feedback,
wherein the user-provided feedback includes at least one of a user-generated description or a re-ranking of the plurality of enriched descriptions.

13. The system of claim 10, wherein the generating includes enriching one or more initial descriptions input to the computer by a user.

14. The system of claim 13, wherein the enriching one or more initial descriptions includes extending an initial description using a language model that predicts a next word based on one or more previous words.

15. The system of claim 13, wherein the enriching one or more initial descriptions includes generating a new description using a language model that paraphrases an initial description, wherein language model is trained as a sequence-to-sequence generator.

16. The system of claim 10, wherein the generating includes automatically generating the enriched descriptions in response to an input of the entity without at least one initial description.

17. The system of claim 16, wherein the automatically generating is performed using a template and language model configured to generate an enriched description based on the template.

18. A computer program product, the computer program product comprising:
one or more computer-readable storage media and program instructions collectively stored on the one or more computer-readable storage media, the program instructions executable by a processor to cause the processor to initiate operations including:
generating a plurality of enriched descriptions corresponding to an entity mentioned in a sentence corpus input to a computer;
computing, using a machine learning model, and based on determining a probability that each mention of the entity in the sentence corpus belongs to one of a plurality of classes, an entropy associated with the plurality of enriched descriptions;
ranking, using a semantic similarity model based on computing the entropy using the machine learning model, each enriched description of the plurality of enriched descriptions, wherein a ranking of an enriched description, of the plurality of enriched descriptions, corresponds to likelihood that a machine learning classifier correctly classifies the entity mentioned in the sentence corpus using information from the enriched description;
selecting, based on the ranking, a subset of the plurality of the enriched descriptions that reduces the entropy; and
outputting the subset of the plurality of enriched descriptions selected.

19. The computer program product of claim 18, wherein the machine learning model identifies and extracts the entity from the sentence corpus based on inferences.

20. The computer program product of claim 18, wherein the likelihood is determined based on a semantic similarity of embedding space encodings of each of the enriched descriptions and the entity.

* * * * *